(12) United States Patent
Rozman et al.

(10) Patent No.: US 8,358,111 B2
(45) Date of Patent: Jan. 22, 2013

(54) ARCHITECTURE FOR DUAL SOURCE ELECTRIC POWER GENERATING SYSTEM

(75) Inventors: Gregory I. Rozman, Rockford, IL (US); David W. Chaudoir, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 643 days.

(21) Appl. No.: 12/630,522

(22) Filed: Dec. 3, 2009

(65) Prior Publication Data
US 2011/0133703 A1 Jun. 9, 2011

(51) Int. Cl.
*F02N 11/04* (2006.01)
(52) U.S. Cl. ............................. 322/46; 322/10
(58) Field of Classification Search .................. 322/10, 322/25, 28, 37, 46, 59
See application file for complete search history.

(56) References Cited

U.S. PATENT DOCUMENTS

| | | | |
|---|---|---|---|
| 4,684,873 A | 8/1987 | Glennon | |
| 5,247,808 A | 9/1993 | Yoshida et al. | |
| 5,363,032 A * | 11/1994 | Hanson et al. | 322/10 |
| 5,430,362 A * | 7/1995 | Carr et al. | 318/779 |
| 5,493,200 A * | 2/1996 | Rozman et al. | 322/10 |
| 5,500,791 A | 3/1996 | Kheraluwala et al. | |
| 5,581,168 A * | 12/1996 | Rozman et al. | 318/723 |
| 5,587,647 A | 12/1996 | Bansal et al. | |
| 5,594,322 A * | 1/1997 | Rozman et al. | 322/10 |
| 5,764,036 A | 6/1998 | Vaidya et al. | |
| 6,844,707 B1 * | 1/2005 | Raad | 322/29 |
| 6,965,183 B2 | 11/2005 | Dooley | |
| 7,439,715 B2 | 10/2008 | Rozman et al. | |
| 7,501,799 B2 | 3/2009 | Rozman et al. | |
| 7,687,928 B2 * | 3/2010 | Taneja et al. | 290/36 R |
| 7,885,089 B2 * | 2/2011 | Rozman et al. | 363/98 |
| 2005/0127771 A1 | 6/2005 | Gerfast | |
| 2009/0009146 A1 | 1/2009 | Rozman et al. | |
| 2009/0251020 A1 | 10/2009 | Gieras et al. | |
| 2009/0251112 A1 | 10/2009 | Gieras et al. | |

OTHER PUBLICATIONS

Extended European Search Report dated May 24, 2011, of the European Patent Office in foreign counterpart application No. EP10252046, filed.

* cited by examiner

*Primary Examiner* — Nicholas Ponomarenko
(74) *Attorney, Agent, or Firm* — Kinney & Lange, P.A.

(57) ABSTRACT

A dual source electric power generating system (EPGS) provides both a regulated AC output and a regulated DC output. The EPGS includes a rotating portion and a stationary portion. The stationary portion includes a plurality of windings (permanent magnet generator (PMG) armature windings, an exciter field winding, and high-voltage main generator armature windings), a voltage regulator, a rectifier, an inverter, a point of regulation (POR) sensor. The high-voltage main generator armature windings generate a high-voltage AC that is converted to a regulated, high-voltage AC by the rectifier and the inverter. The stationary portion is further characterized by circuitry for producing the regulated DC output from AC voltage produced by a winding other than the high-voltage main generator armature windings.

20 Claims, 6 Drawing Sheets

ARCHITECTURE FOR DUAL SOURCE ELECTRIC POWER GENERATING SYSTEM

BACKGROUND

The present invention relates to power generation systems, and more particularly to a dual source power generation system.

An electric power generating system (EPGS) converts mechanical energy to electrical energy for distribution to one or more loads. In some applications, the loads have different power source requirements. For example, some loads may require high-voltage alternating current (AC) power (e.g., 100 kiloWatt (kW), 480 Volt AC (Vac) while others may require relatively low-voltage direct-current (DC) power (e.g., 40 kW, 28 Vdc).

Prior art solutions provide for separate power generation and power conversion. For example, a typical electric power generating system includes a generator for generating electric power and power conversion components for converting the electric power to a desired AC voltage and a desired DC voltage. A commonly employed architecture has electric power generating means that include a main generator armature winding that provides a high-voltage AC and a rectifier for converting the high-voltage AC output to a high-voltage DC output. The high-voltage DC output is monitored and used in feedback to regulate the magnitude of the high-voltage DC output. The EPGS further includes power conversion means for converting the regulated high-voltage DC voltage to both a high-voltage AC output and a low-voltage DC output for consumption by attached loads. For example, in one such architecture, an inverter converts the regulated high-voltage DC output to a high-voltage AC output. To generate the desired DC voltage, the regulated high-voltage AC output provided by the generator armature windings is converted to a regulated low-voltage DC output by a transformer-rectifier unit (TRU). However, for high-power applications the sizing requirement of the TRU adds significant weight to the system.

Other prior art solutions avoid the use of a TRU by employing a DC-to-DC converter for converting the high-voltage rectified output provided by the generator to a desired DC output voltage. To provide the desired isolation between the high-voltage AC output and the low-voltage DC output, the DC-to-DC converter requires galvanic isolation, which once again adds to the overall weight/cost of the system.

SUMMARY

An electric power generating system (EPGS) provides both a regulated alternating current (AC) output and a regulated direct current (DC) output. The EPGS includes a rotating portion and a stationary portion. The rotating portion includes components connected along a common shaft, including permanent magnets (PM), exciter armature windings, a rotating rectifier, and a main generator field winding. The stationary portion includes a plurality of windings that include permanent magnet generator (PMG) armature windings, an exciter field winding, and first main generator armature windings, a voltage regulator, an inverter, and a point of regulation sensor. The AC output of the EPGS is derived from the main generator field winding, wherein the rectifier and inverter convert the high-voltage AC provided by the main generator field winding to a regulated AC output. The stationary portion is further characterized by circuitry for producing the regulated DC output from AC voltage produced by a winding other than the first main generator armature windings.

DETAILED DESCRIPTION

Figure 1:
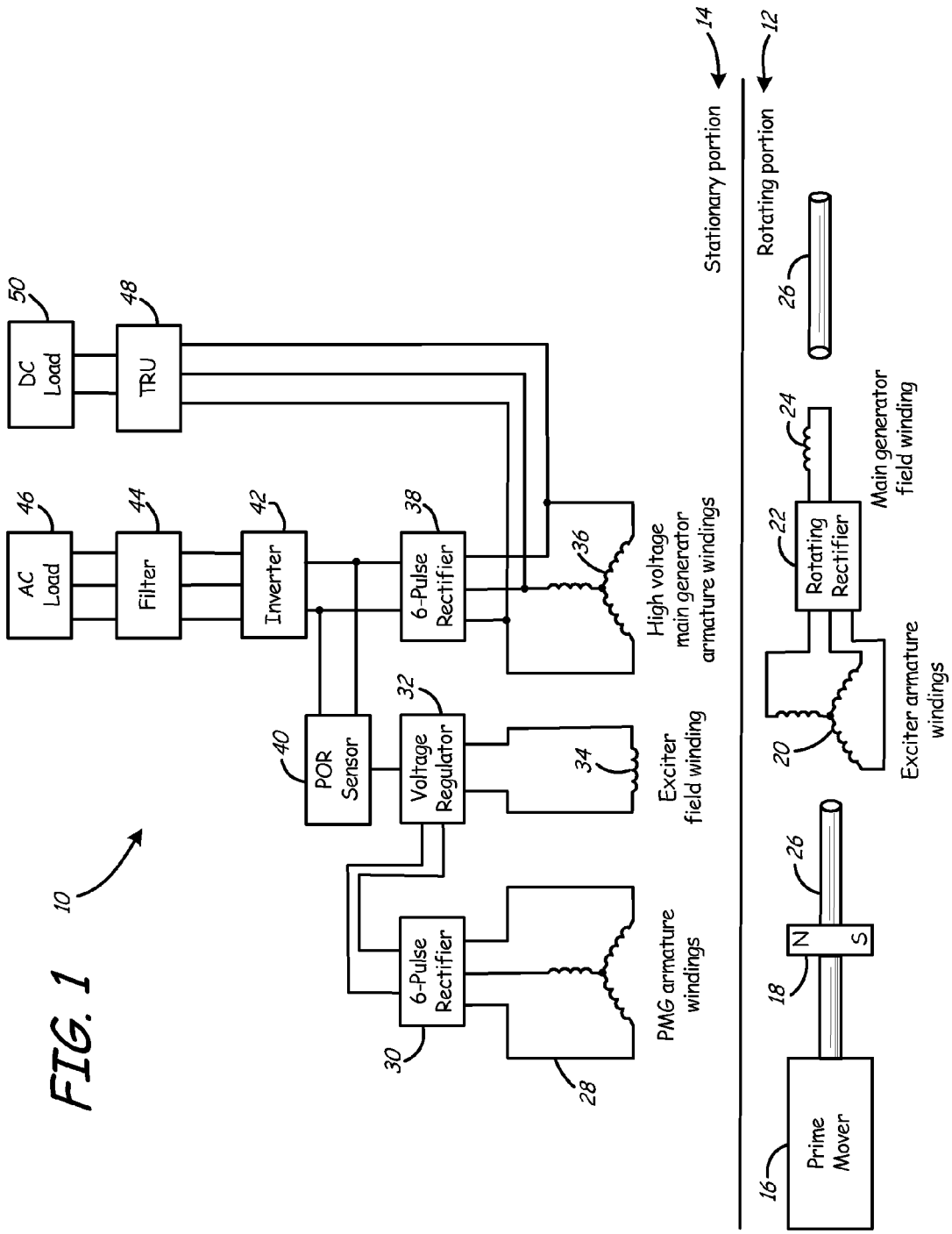
FIG. 1 is a block diagram illustrating an electric power generating system (EPGS) as known in the prior art.

FIG. 1 is a block diagram illustrating electric power generating system (EPGS) 10 as known in the prior art. As shown in FIG. 1, EPGS 10 includes rotating portion 12 and stationary portion 14. Rotating portion 12 includes prime mover 16, permanent magnet portion 18, exciter armature windings 20, rotating rectifier 22, and main generator field winding 24, each connected along common shaft 26. Stationary portion 14 includes permanent magnet generator (PMG) armature windings 28, rectifier 30, voltage regulator 32, exciter field winding 34, high-voltage main generator armature windings 36, rectifier 38, point-of-regulation (POR) sensor 40, inverter 42, filter 44, alternating current (AC) load 46, transformer-rectifier unit (TRU) 48 and direct current (DC) load 50.

As shown in FIG. 1, permanent magnets 18, exciter armature windings 20, and main generator field windings 24 are connected to common shaft 26. Prime mover 16 provides mechanical energy that causes shaft 26, and all components connected to shaft 26, to rotate. Magnetic flux provided by permanent magnets 18 interacts with PMG armature windings 28 to generate an AC voltage in PMG armature windings 28. The magnitude of the AC output of PMG armature windings 28 depends on the rotational speed of permanent magnets 18 and is therefore unregulated. Rectifier 30 rectifies the AC output and provides a DC control voltage to voltage regulator 32. The DC control voltage is selectively applied to exciter field winding 34 by voltage regulator 32 based on the monitored DC output voltage of EPGS 10 (i.e., the DC output provided by rectifier 38 at the point-of-regulation (POR)). By selectively varying the excitation provided to exciter field winding 34, the monitored DC output voltage is regulated to a desired value.

Exciter armature windings 20 generate an AC output in response to the excitation provided to exciter field winding 34. The AC output is rectified by rotating rectifier 22 and supplied to main generator field winding 24. In response to magnetic flux provided by main generator field winding 24, high-voltage main generator armature windings 36 generate a high-voltage AC output. Rectifier 38 rectifies the high-voltage AC output provided by high-voltage main generator armature windings 36 to produce a high-voltage DC output. Inverter 42 converts the rectified high-voltage DC output provided by rectifier 38 to a high-voltage AC output voltage having a desired magnitude and frequency for consumption by AC load 46.

In the prior art embodiment shown in FIG. 1, the low-voltage DC output provided to DC load 50 is derived from the high-voltage AC output provided by main generator armature windings 36. The conversion from a high-voltage AC output to a low-voltage DC output is provided by TRU 48, which includes a transformer and rectifier circuit (not shown). The transformer steps down the high-voltage AC output to a low-voltage AC output and the rectifier circuit converts the stepped-down voltage to a low-voltage DC output. In addition, the transformer provides isolation between the DC output voltage and the AC output voltage. However, for high-power applications (e.g., 40 kilo-Watt (kW), 28 Vdc) the sizing requirements for the transformer add additional weight and cost to the electric power generating system. The TRU is sized to provide a regulated DC output based on the magnitude of the regulated AC output provided by inverter 42.

In other prior art embodiments, the TRU is replaced with a DC-to-DC converter that converts the high-voltage DC output provided by six-pulse rectifier 38 to a low-voltage DC output voltage of a desired magnitude. However, to provide the necessary isolation between the regulated DC output voltage and the regulated AC output voltage, some sort of galvanic isolation is required (e.g., high-frequency transformer). Once again, for high-power applications the size of these components adds additional weight and cost that is undesirable.

The present invention reduces the weight of the prior art systems with various EPGS architectures that utilize separate windings to generate the desired AC output voltage and the desired DC output voltage, while still providing the desired regulation of both the AC output voltage and the DC output voltage. In each embodiment, the dual source EPGS generates an alternating current (AC) output and a direct current (DC) output. In each case, the DC output is generated by windings separate from those used to generate the AC output.

Figure 2:
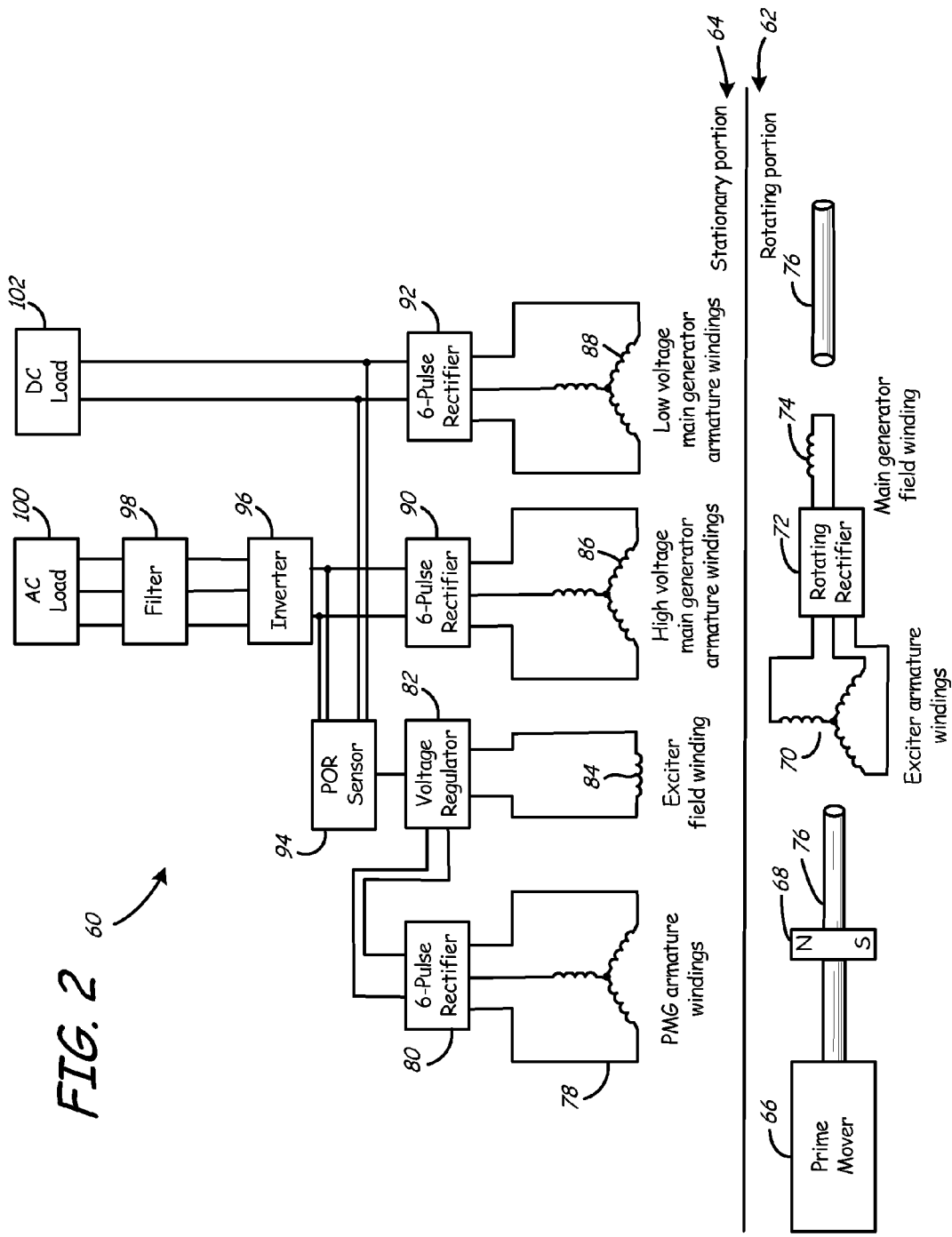
FIG. 2 is a block diagram illustrating an EPGS according to an embodiment of the present invention.

FIG. 2 is a block diagram illustrating electric power generating (EPGS) system 60 according to an embodiment of the present invention. As shown in FIG. 2, EPGS 60 includes rotating portion 62 and stationary portion 64. Rotating portion 62 includes prime mover 66, permanent magnet portion 68, exciter armature windings 70, rotating rectifier 72, and main generator field winding 74, each connected along common shaft 76. Stationary portion 64 includes permanent magnet generator (PMG) armature windings 78, rectifier 80, voltage regulator 82, exciter field winding 84, high-voltage main generator armature windings 86, low-voltage main generator armature windings 88, rectifier 90, rectifier 92, point-of-regulation (POR) selector 94, inverter 96, filter 98, alternating current (AC) load 100, and direct current (DC) load 102.

As compared with the prior art EPGS 10 shown in FIG. 1, EPGS 60 differs in that it includes an additional main generator armature winding (low-voltage main generator armature winding 88) for generating the desired low-voltage DC output. Hence, this embodiment is referred to as "Dual Armature Wound Field Synchronous Machine (WFSM)." As described with respect to FIG. 1, EPGS 60 similarly includes rotating portion 62 and stationary portion 64. The rotation of permanent magnets 68 induces an AC voltage on PMG armature windings 78. Six-pulse rectifier 80 rectifies the AC voltage, and voltage regulator 82 provides controlled DC excitation to exciter field winding 84. In response to the excitation on exciter field winding 84, an AC voltage is induced on exciter armature windings 70 that is rectified by rotating rectifier 72 and provided to main generator field winding 74.

In contrast with the prior art however, EPGS 60 includes both a high-voltage main generator armature winding 86 and a low-voltage main generator armature winding 88. Both main generator armature windings generate an AC voltage in response to excitation provided to main generator field winding 74. However, high-voltage main generator armature winding 86 generates a high-voltage AC output and low-voltage main generator armature winding 88 generates a low-voltage AC output. The output generated by each armature winding is a factor of the position of the winding relative to main generator field winding 74, the number of windings or turns associated with each winding, and other factors well-known in the art.

Rectifier 92 rectifies the low-voltage AC output provided by low-voltage main generator armature winding 88 and provides the rectified DC output to DC load 102. In the embodiment shown in FIG. 2, point-of-regulation (POR) selector 94 monitors the low-voltage DC output and selectively controls through voltage regulator 82 the excitation provided to exciter field winding 84. In this way, the low-voltage DC output provided by rectifier 92 is regulated to a desired magnitude. In this embodiment, rectifier 92 (as well as rectifier 90) is a six-pulse rectifier comprised of three pairs of diodes, each pair operating to rectify one phase of the low-voltage AC output provided by low-voltage main generator armature windings 88.

Similarly, rectifier 90 rectifies the high-voltage AC output provided by high-voltage main generator armature winding 86. Inverter 96 converts the rectified output to a high-voltage AC output voltage having a desired magnitude and frequency. The AC output voltage generated by inverter 96 is provided through filter 98 to AC load 100. During normal operation, the high-voltage DC output provided by rectifier 90 is not directly regulated. Rather, it is indirectly regulated as a result of regulation of the low-voltage DC output provided by rectifier 92. In addition, moderate variations in the unregulated high-voltage DC output are compensated for by the DC-to-AC conversion provided by inverter 96. In this way, the AC output voltage provided by inverter 96 is regulated to a desired magnitude, despite a lack of direct regulation of the output provided by high-voltage main generator armature windings 86.

However, as shown in FIG. 2, POR selector 94 may be adapted to monitor both the low-voltage DC output provided by rectifier 92 and the high-voltage DC output provided by rectifier 90. In instances in which a fault occurs on the low-voltage DC output (e.g., short-circuit, overload, etc.), POR selector 94 can switch from monitoring the low-voltage DC output to the high-voltage DC output, allowing for meaningful regulation of the excitation provided to exciter field winding 84. In this embodiment, POR selector 94 includes circuitry for detecting faults, such as short-circuit faults and overload faults. In response to a fault associated with the low-voltage DC output, POR selector 94 switches to monitoring the high-voltage DC output. In instances in which the high-voltage DC output is monitored, voltage regulator 82 may vary the reference voltage used to control the excitation provided to exciter armature windings 70.

Figure 3:
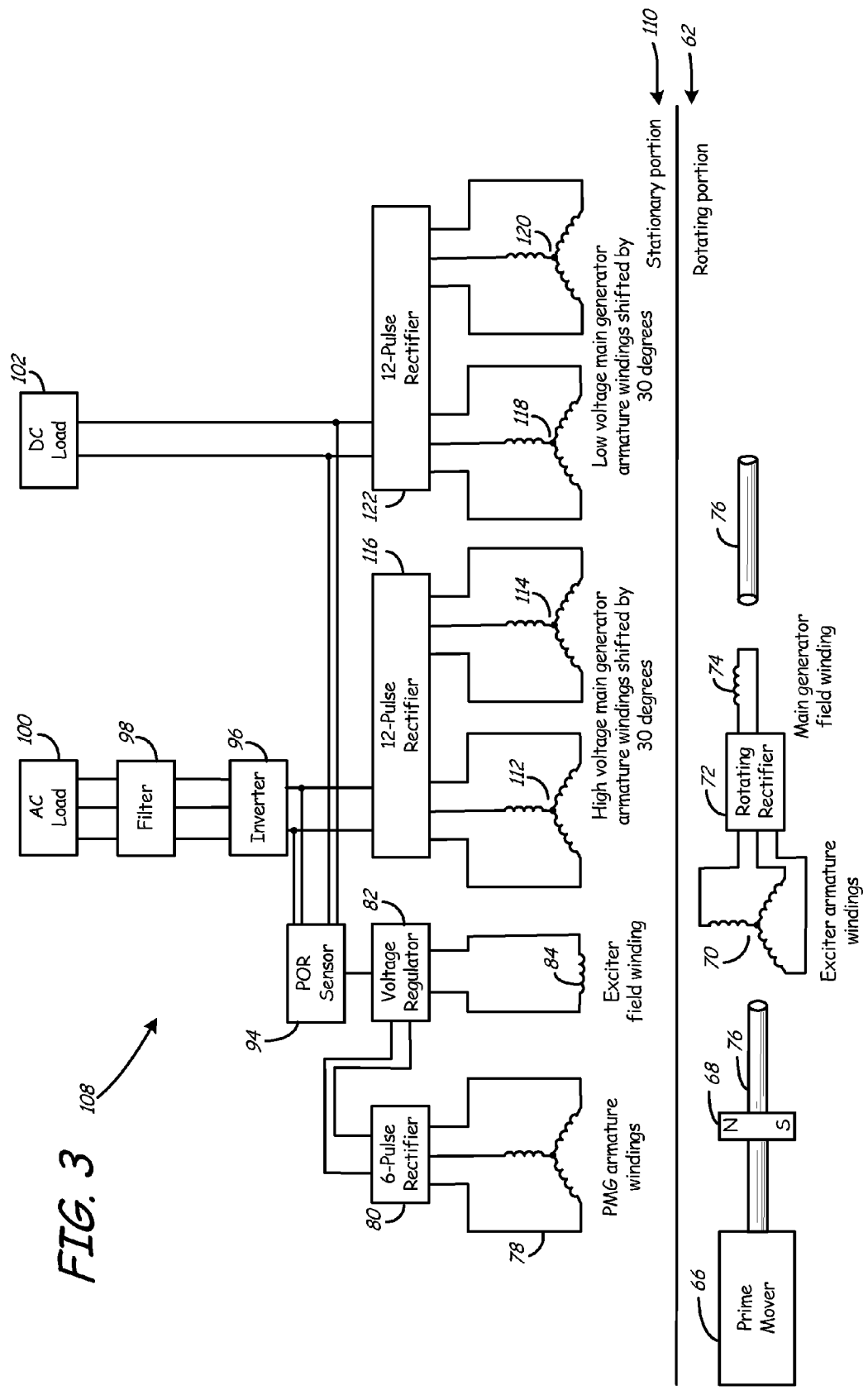
FIG. 3 is a block diagram illustrating an EPGS according to another embodiment of the present invention.

FIG. 3 is a block diagram illustrating electric power generating system 110 according to another embodiment of the present invention. The embodiment shown in FIG. 3 is substantially the same as the embodiment shown in FIG. 2, with like reference numerals being used for similar components. The main difference is the presence of additional armature windings (e.g., four) as compared with the number of armature windings (two) employed in the embodiment shown in FIG. 2. Hence, this embodiment is referred to as a "Quad Armature Wound Field Synchronous Machine (WFSM)". A high-voltage AC output is generated by first and second high-voltage main generator armature windings 112 and 114, respectively. A low-voltage AC output is generated by first and second low-voltage main generator armature windings 118 and 120, respectively. For both pairs of armature windings, the second winding is shifted by thirty degrees relative to the first winding such that the six-phase AC outputs generated by the windings are each out of phase with one another by thirty degrees. For example, with respect to the windings for generating the high-voltage AC output, second high-voltage main generator armature winding 114 is shifted thirty degrees relative to first high-voltage main generator winding 112. Twelve-pulse rectifier 116 therefore includes six pairs of diodes for rectifying each of the six phases generated by windings 112 and 114. Inverter 96 converts the high-voltage DC output to a high-voltage AC output for consumption by AC load 100. Likewise, twelve-pulse rectifier 122 converts each of the six phases generated by low-voltage main generator armature windings 118 and 120 (once again, shifted by thirty degrees relative to one another) to a low-voltage DC output for consumption to DC load 102. A benefit of employing additional armature windings and twelve-pulse rectifiers is a reduction of voltage ripple on the low-voltage DC output provided to DC load 102 and improved harmonic distortion for the high-voltage AC output provided to AC load 100.

Once again, POR selector 94 is connected to selectively monitor the low-voltage DC output or the high-voltage DC output. As described with respect to the dual armature EPGS illustrated in FIG. 2, during normal operation POR selector 94 monitors the low-voltage DC output provided by twelve-pulse rectifier 122. The low-voltage DC output provided by twelve-pulse rectifier 122 to DC load 102 is therefore regulated to a desired value by POR selector 94 and voltage regulator 82. During normal operation, the magnitude of the high-voltage DC output provided by twelve-pulse rectifier 116 is indirectly regulated based on the regulation provided to the low-voltage DC output. Variations in the high-voltage DC output are compensated for by inverter 96.

In response to fault conditions detected on the low-voltage DC output (e.g., short-circuit, overload, etc.), POR selector 94 switches to monitoring the high-voltage DC output provided by twelve-pulse rectifier 116. In this way, a fault on the low-voltage DC output does not prevent generation and regulation of the high-voltage AC output for consumption by AC load 100.

Figure 4:
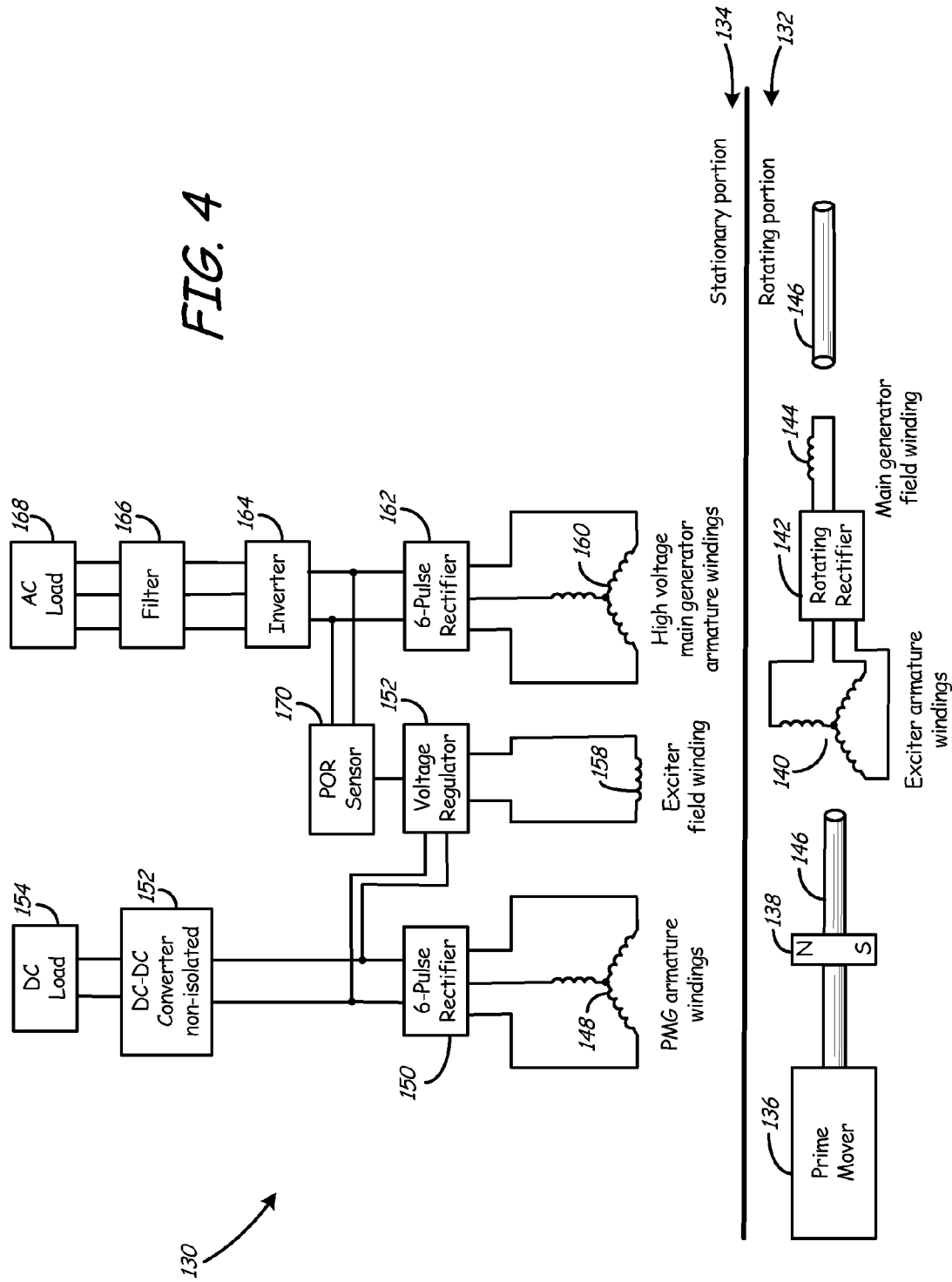
FIG. 4 is a block diagram illustrating an EPGS according to another embodiment of the present invention.

FIG. 4 is a block diagram illustrating electric power generating system 130 according to another embodiment of the present invention. EPGS 130 includes rotating portion 132 and stationary portion 134. Rotating portion 132 includes prime mover 136, permanent magnets 138, exciter armature windings 140, rotating rectifier 142, main generator field winding 144, connected to common shaft 146. Stationary portion 134 includes PMG armature windings 148, rectifier 150, DC-to-DC converter 152, DC load 154, voltage regulator 156, exciter field winding 158, high-voltage main generator armature windings 160, rectifier 162, inverter 164, filter 166, and AC load 168.

The embodiment shown in FIG. 4 generates the low-voltage DC output voltage for DC load 154 based on the output provided by PMG armature windings 148 (as opposed to main generator armature windings as employed in the embodiments shown in FIGS. 2 and 3). Hence, EPGS 130 is referred to as "Permanent Magnet Generator (PMG), Non-isolated DC-to-DC Converter and WFSM". Prime mover 136 provides mechanical energy that causes shaft 146, and all components connected to shaft 146, to rotate. As a result, permanent magnets 138 generate an AC voltage in PMG armature windings 148. Rectifier 150 provides a low-voltage DC output to DC-to-DC converter 152 based on the low-voltage AC output provided by PMG armature windings 148. DC-to-DC converter 152 converts the unregulated DC output provided by rectifier 150 to a regulated DC output for consumption by DC load 154. An example of a DC-to-DC converter 152 is an interleaved converter (i.e., includes multiple switches operating at the same switching frequency with their switching waveforms phase shifted over a switching period), described in more detail with respect to FIG. 5. In other embodiments, various configurations of non-isolated dc-dc converters may be employed.

As compared with the embodiments shown in FIGS. 2 and 3, in which the PMG armature winding 148 and associated rectifier 150 not only provide excitation to exciter field winding 158, but also provide DC voltage to DC-to-DC converter 152, which provides the low-voltage DC output directly to DC load 154. Because PMG armature winding 148 is isolated from high-voltage main generator armature winding 160, DC-to-DC converter 152 does not have to provide additional galvanic isolation (e.g., transformer). In the embodiment shown in FIG. 4, permanent magnets 138 and PMG armature windings 148 are sized to meet the voltage and power requirements of DC load 154 (i.e., as compared to the permanent magnets (PM) and armature windings employed in FIGS. 2 and 3, the size of PMs 138 and PMG winding 142 are increased to meet the increased power requirements of DC load 154).

In addition, the DC output provided by rectifier 150 is provided to voltage regulator 156, which selectively applies the DC voltage to exciter field winding 158. The excitation provided to exciter field winding 158 generates an AC voltage on exciter armature windings 140. Rotating rectifier 142 rectifies the AC voltage provided by exciter armature windings 140, and provides the rectified output to main generator field winding 144. High-voltage main generator armature windings 160 generate a high-voltage AC output voltage in response to the excitation provided to main generator field winding 144. The AC output voltage is rectified by rectifier 162 to a high-voltage DC output. Inverter 164 converts the high-voltage DC output to a high-voltage AC output for consumption by AC load 168.

POR sensor 170 monitors the DC output provided by rectifier 162, and voltage regulator 156 selectively applies excitation to exciter field winding 158 based on the monitored DC output. In this way, the output provided by rectifier 162 is regulated to a desired value. The DC output provided to DC load 154 is similarly regulated by DC-to-DC converter 152. Because PMG armature windings 148 are galvanically isolated from high-voltage main generator armature windings 160, DC-to-DC converter 152 does not require additional isolation components such as a transformer.

Figure 5:
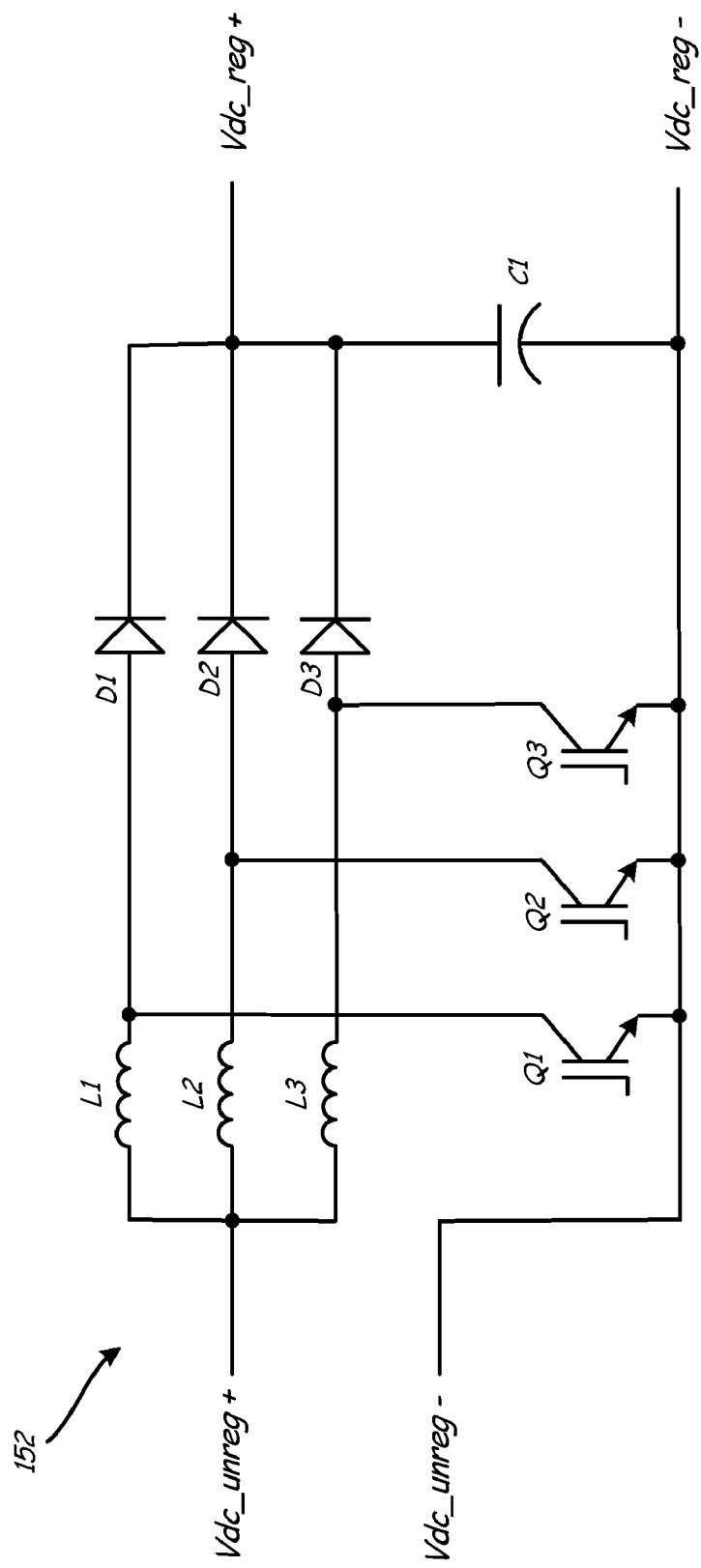
FIG. 5 is a circuit diagram of a non-isolated, three-module, interleaved direct current (DC)-to-DC converter employed in the EPGS described with respect to FIG. 4.

FIG. 5 is a circuit diagram of a well known non-isolated, three-module, interleaved DC-to-DC converter 152 employed in EPGS 130 shown in FIG. 4. Converter 152 includes inductors L1, L2 and L3, diodes D1, D2 and D3, switches Q1, Q2 and Q3, and DC-link capacitor C1.

Figure 6:
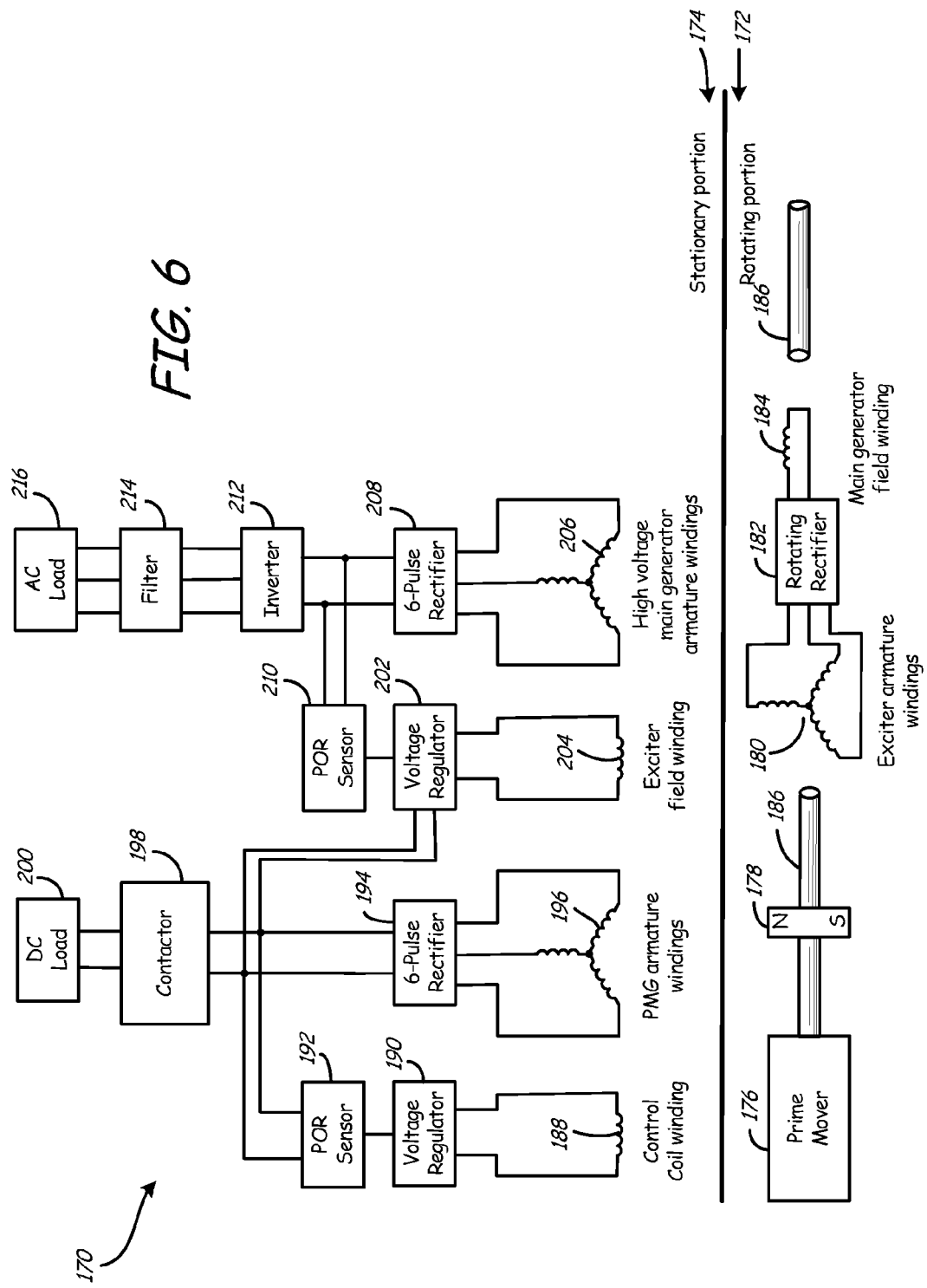
FIG. 6 is a block diagram illustrating an EPGS according to another embodiment of the present invention.

FIG. 6 is a block diagram illustrating electric power generating system (EPGS) 170 according to another embodiment of the present invention. EPGS 170 includes rotating portion 172 and stationary portion 174. Rotating portion 172 includes prime mover 176, permanent magnets 178, exciter armature windings 180, rotating rectifier 182, main generator field winding 184, connected to common shaft 186. Stationary portion 174 includes control coil winding 188, voltage regulator 190, POR sensor 192, six-pulse rectifier 194, regulated PMG armature windings 196, contactor 198, DC load 200, voltage regulator 202, exciter field winding 204, high-voltage main generator armature windings 206, six-pulse rectifier 208, POR sensor 210, inverter 212, filter 214, and AC load 216.

Similar to the embodiments shown in FIGS. 2-4, EPGS 170 generates the DC output and the AC output using two separate armature windings. In this embodiment, the low-voltage DC output is generated by a flux regulated permanent magnet generator that includes permanent magnets 178, a control coil winding 188 and PMG armature windings 196, while the high-voltage AC output is generated by a main generator that includes exciter field winding 204, exciter armature windings 180, rotating rectifier 182, main generator field winding 184 and high-voltage main generator armature windings 206. In contrast with the embodiment described with respect to FIG. 4, in which the DC output was produced by a non-regulated PMG and regulation was provided by a DC-to-DC converter, EPGS 170 includes a flux regulated PMG, wherein regulation of the AC output provided by PMG armature windings 196 is provided by voltage regulator 190, and POR sensor 192. By regulating the AC output of PMG armature windings 196, regulation is provided to the DC output provided by six-pulse rectifier 194 to DC load 200. Hence, EPGS 170 is referred to as "Flux-Regulated PMG, Wound Field Synchronous Machine with DC Link Inverter."

Once again, prime mover 176 provides rotational energy to permanent magnets 178, exciter armature windings 180, and main generator field winding 184, all connected along common shaft 186. Six-pulse rectifier 194 rectifies the AC output provided by flux regulated PMG armature windings 196 and provides the DC output through contactor 198 to DC load 200. Regulation of the DC output provided by PMG armature windings 196 and six-pulse rectifier 194 is provided by POR sensor 192 and voltage regulator 190, which provide controlled excitation to control coil winding 188 to regulate the flux provided to regulated armature winding 196. That is, POR sensor 192 monitors the DC output provided to DC load 200. In response to the monitored DC output, voltage regulator 190 provides DC excitation to control coil winding 188 that interacts with the flux provided by permanent magnets 178. In this way, the flux provided to PMG armature windings is regulated, allowing the DC voltage provided by six-pulse rectifier to be regulated without the need for a DC-to-DC converter. Examples of flux regulated permanent magnet machines are described in the following commonly-owned patents and applications, including: U.S. Patent Application No. US2009/0251020, titled "Permanent Magnet Dynamoelectric Machine with Variable Magnetic Flux Excitation" to Jacek F. Gieras and Gregory I. Rozman, U.S. Patent Application No. 2009/0251112, titled "Permanent Magnet Electric Generator with Variable Magnet Flux Excitation" to Jacek F. Gieras and Gregory I. Rozman, U.S. Patent Application No. 2009/0009146, titled "Generating System with a Regulated Permanent Magnet Machine" to Gregory I. Rozman and Kevin Dooley, and U.S. Pat. No. 7,501,799, titled "Engine Start System with a Regulated Permanent Magnet Machine" to Gregory I. Rozman, Matthew L. Wilhide, and Arthur A. Pershall.

Contactor 198 provides the ability to isolate DC load 200 from the DC voltage provided by six-pulse rectifier 194 to voltage regulator 202. In the event a short-circuit or other fault is detected in DC load 200, contactor 198 is opened to allow EPGS 170 to continue providing AC output to AC load 216.

The regulated DC output provided by six-pulse rectifier 194 is provided to voltage regulator 202, which provides a controlled DC excitation to exciter field winding 204. In response to this excitation, exciter armature windings 180 generate an AC output voltage that is rectified by rotating rectifier 182, with the rectified output being provided to main generator field winding 184. In response, high-voltage main generator armature windings 206 provides provide a high-voltage AC output to six-pulse rectifier 208. Inverter 212 converts the rectified DC output provided by six-pulse rectifier 208 to an AC output voltage having a desired magnitude and frequency that is provided through filter 214 to AC load 216.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, an application requiring a high-voltage AC output and a low-voltage DC output has been described with respect to FIGS. 2-6. However, other applications may require various combinations of voltage and power. The various architectures could be configured by a designer of ordinary skill in the art to provide various output voltages. Therefore, it is intended that the invention not be limited to the particular embodiment(s) disclosed, but that the invention will include all embodiments falling within the scope of the appended claims.

The invention claimed is:

1. An electric power generating system (EPGS) for providing both a regulated alternating current (AC) output and a regulated direct current (DC) output, the EPGS comprising:
   a rotating portion having components connected along a common shaft, the rotating portion comprising:
       permanent magnets (PM);
       exciter armature windings;
       a rotating rectifier; and
       a main generator field winding:
   a stationary portion comprising:
       a plurality of windings that include permanent magnet generator (PMG) armature windings, an exciter field winding, and first main generator armature windings;
       a first voltage regulator that controls excitation provided to the exciter field winding;
       a first rectifier that converts AC from the first main generator armature windings to DC;
       an inverter that converts the DC from the first rectifier to the regulated AC output; and
       a first point-of-regulation (POR) sensor for sensing and providing control output to the voltage regulator;
   the stationary portion characterized by circuitry for producing the regulated DC output from AC voltage produced by a winding other than the first main generator armature windings.

2. The EPGS of claim 1, wherein the winding comprises second main generator armature windings for generating an AC output, the EPGS further including:
   a second rectifier for converting the AC output provided by the second main generator armature windings to the regulated DC output, wherein the first voltage regulator controls excitation provided to the exciter field winding based on monitoring by the first POR sensor of the DC output provided by the second rectifier.

3. The EPGS of claim 2, wherein the AC output provided by the second main generator armature windings is a three-phase output, and wherein the second rectifier includes three pairs of diodes for converting the three-phase output to the regulated DC output.

4. The EPGS of claim 2, wherein the second main generator armature winding is comprised of a first set of sub-windings and a second set of sub-windings offset in phase from the first set of sub-windings, wherein the first and second sub-windings generate a six-phase AC output, and wherein the second rectifier includes six pairs of diodes for converting the six-phase output to the regulated DC output.

5. The EPGS of claim 2, wherein the first POR sensor is configured to monitor the DC output provided by the first rectifier in response to a fault in the DC output provided by the second rectifier.

6. The EPGS of claim 1, wherein the winding comprises permanent magnet generator (PMG) armature windings for generating an AC voltage that is converted to the regulated DC output.

7. The EPGS of claim 6, further including:
a second rectifier for converting the AC voltage produced by the PMG armature windings to an unregulated DC voltage; and
a DC-to-DC converter for converting the unregulated DC voltage provided by the second rectifier to the regulated DC voltage.

8. The EPGS of claim 7, wherein the first voltage regulator controls excitation provided to the exciter field winding based on monitoring by the first POR sensor of the DC output provided by the first rectifier.

9. The EPGS of claim 7, wherein the DC-to-DC converter is a non-isolated DC-to-DC converter.

10. The EPGS of claim 6, further including:
a second rectifier for converting the AC voltage produced by the PMG armature windings to the regulated DC output;
a second POR sensor for monitoring the DC provided by the second rectifier;
a control coil winding; and
a second voltage regulator that controls excitation provided to the control coil winding to regulate flux provided to the PMG armature windings based on the monitored DC provided by the second rectifier.

11. The EPGS of claim 10, further including:
a contactor connected between the second rectifier and an output for providing the regulated DC output to a load, wherein the contactor is opened in response to a fault in the output.

12. An electric power generating system (EPGS) for providing both an alternating current (AC) output and a direct current (DC) output, the EPGS comprising:
a rotating portion having components connected along a common shaft, the rotating portion comprising:
permanent magnets (PM);
exciter armature windings;
a rotating rectifier; and
a main generator field winding:
a stationary portion comprising:
a plurality of windings that include permanent magnet generator (PMG) armature windings, an exciter field winding, high-voltage main generator armature windings, and low-voltage main generator armature windings;
a first rectifier that converts high-voltage AC from the high-voltage main generator armature windings to high-voltage DC;
an inverter that converts the high-voltage DC from the first rectifier to the regulated high-voltage AC output;
a second rectifier that converts low-voltage AC from the low-voltage main generator armature windings to low-voltage DC;
a point-of-regulation (POR) sensor that monitors the low-voltage DC provided by the second rectifier; and
a first voltage regulator that controls excitation provided to the exciter field winding based on the monitored low-voltage DC provided by the second rectifier.

13. The EPGS of claim 12, wherein the high-voltage AC output provided by the high-voltage main generator armature is a three-phase output, and wherein the first rectifier is a six-pulse rectifier having three pairs of diodes connected to convert each phase of the high-voltage AC output to the high-voltage DC output.

14. The EPGS of claim 12, wherein the low-voltage AC output provided by the low-voltage main generator armature is a three-phase output, and wherein the second rectifier is a six-pulse rectifier having three pairs of diodes connected to convert each phase of the low-voltage AC output to the low-voltage regulated DC output.

15. The EPGS of claim 12, wherein the POR sensor is further connected to monitor the high-voltage DC output provided by the first rectifier, wherein in response to a fault condition with on the low-voltage DC, the POR sensor switches to monitoring the high-voltage DC output.

16. The EPGS of claim 12, wherein the high-voltage main generator armature windings provide a six-phase high-voltage output, wherein the first rectifier is a twelve-pulse rectifier comprising six-pairs of diodes for converting the six-phase high-voltage output to the high-voltage DC.

17. The EPGS of claim 12, wherein the low-voltage main generator armature windings provide a six-phase high-voltage output, wherein the second rectifier is a twelve-pulse rectifier comprising six-pairs of diodes for converting the six-phase low-voltage AC to the high-voltage DC output.

18. An electric power generating system (EPGS) for providing both a high-voltage alternating current (AC) output and a low-voltage direct current (DC) output, the EPGS comprising:
a rotating portion having components connected along a common shaft, the rotating portion comprising:
permanent magnets (PM);
exciter armature windings;
a rotating rectifier; and
a main generator field winding:
a stationary portion comprising:
a plurality of windings that include permanent magnet generator (PMG) armature windings, an exciter field winding, and high-voltage main generator armature windings;
a first rectifier that converts high-voltage AC from the high-voltage main generator armature windings to high-voltage DC;
an inverter that converts the high-voltage DC from the first rectifier to the regulated high-voltage AC output;
a point-of-regulation (POR) sensor that monitors the high-voltage DC provided by the first rectifier; and
a first voltage regulator that controls excitation provided to the exciter field winding based on the monitored high-voltage DC provided by the first rectifier;
the stationary portion characterized by circuitry for producing the regulated low-voltage DC output from AC voltage produced by the PMG armature windings.

19. The EPGS of claim 18, further including:
a second rectifier for converting the low-voltage AC voltage produced by the PMG armature windings to an unregulated DC voltage; and
a DC-to-DC converter for converting the unregulated DC voltage provided by the second rectifier to the regulated DC voltage.

20. The EPGS of claim 18, further including:
a second rectifier for converting the low-voltage AC voltage produced by the PMG armature windings to the regulated low-voltage DC output;

a second POR sensor for monitoring the low-voltage DC provided by the second rectifier;
a control coil winding; and
a second voltage regulator that controls excitation provided to the control coil winding to regulate flux provided to the PMG armature windings based on the monitored low-voltage DC provided by the second rectifier.

* * * * *